United States Patent [19]

Wisthuff et al.

[11] Patent Number: 4,493,675

[45] Date of Patent: Jan. 15, 1985

[54] UNIVERSAL JOINT

[75] Inventors: Scott D. Wisthuff, South Bend, Ind.; Edgar A. Behrmann, Niles, Mich.

[73] Assignee: The Bendix Corporation, Southfield, Mich.

[21] Appl. No.: 487,556

[22] Filed: Apr. 22, 1983

[51] Int. Cl.³ .............................................. F16D 3/24
[52] U.S. Cl. ...................................... 464/136; 464/134
[58] Field of Search ............... 464/136, 112, 139, 134, 464/147, 905; 411/166

[56] References Cited

U.S. PATENT DOCUMENTS

| | | | |
|---|---|---|---|
| 712,429 | 10/1902 | Wilhelm | 411/166 X |
| 966,949 | 8/1910 | Posson | 411/166 X |
| 1,358,221 | 11/1920 | Leppert | 464/139 |
| 1,913,045 | 6/1933 | Wood | 464/139 |
| 2,395,377 | 2/1946 | MacLean | 411/166 |
| 3,107,506 | 10/1963 | Klomp | 464/11 |
| 3,217,516 | 11/1965 | Runkle | 464/139 |
| 3,279,518 | 10/1966 | Bollinger | 411/166 |
| 3,296,830 | 1/1967 | Runkle | 464/139 |

Primary Examiner—Stuart S. Levy
Assistant Examiner—Thomas R. Hannon
Attorney, Agent, or Firm—Paul David Schoenle; Ken C. Decker

[57] ABSTRACT

A universal joint includes a first member and a second member joined via a coupling assembly. The coupling assembly includes a pair of washer-like seats engageable with ball studs carried by the pair of members and a nut and bolt assembly. The nut and bolt assembly cooperates with one of the washer-like elements to define a stop and the one washer-like elements defines a stop with at least one of the ball studs and/or one of the members to permit easy assembly of the universal joint and smaller members.

2 Claims, 2 Drawing Figures

UNIVERSAL JOINT

This invention relates to a universal joint wherein a first member is rotatably coupled to a second member such that the members are angularly disposed relative to each other.

It is known that a universal joint can be formed by ball studs, a pair of washer-like seats engageable with the ball studs and a nut and bolt assembly retaining the pair of washer-like seats in engagement with the ball studs. In order to assemble such a universal joint, it is necessary to use a pair of tools, one for holding the bolt and the other for tightening the nut on the bolt to fully engage the pair of washer-like seats with the ball studs. A first pair of ball studs are carried by the first member and a second pair of ball studs are carried by the second member.

The prior art is illustrated by U.S. Pat. No. 3,107,506. In the prior art there are openings provided on the first and second members to expose the nut and bolt assembly for tightening via suitable holding tools or wrenches. However, if one or both of the openings are eliminated there is no room for the tools and the nut and bolt assembly is not easily tightened to complete the universal joint. Additional prior art is illustrated by U.S. Pat. No. 3,217,516.

The present invention provides a universal joint comprising a first member and a second member rotatable together about their individual axes which are angularly disposed with respect to each other, each of the members carrying a pair of ball studs, a pair of washer-like seats engageable with the ball studs and a nut and bolt assembly cooperating with the pair of washer-like seats to retain the latter in engagement with the ball studs, chracterized in that said nut and bolt assembly cooperates with one of said pair of washer-like seats to define a nonrotatable interface and said one washer-like seat is disposed in opposition to at least one of said ball studs and/or one of said members when the nut and bolt assembly are assembled to engage the pair of washer-like seats with the ball studs, said one washer-like seat cooperating with at least said one ball stud during assembly to permit said pair of washer-like seats to engage said ball studs in the absence of a holding tool preventing rotation of said nut and bolt assembly.

It is an advantage of the present invention that the universal joint can be readily assembled without a holding tool for the nut and bolt assembly.

The accompanying drawings illustrate one embodiment for the present invention.

Figure 1:
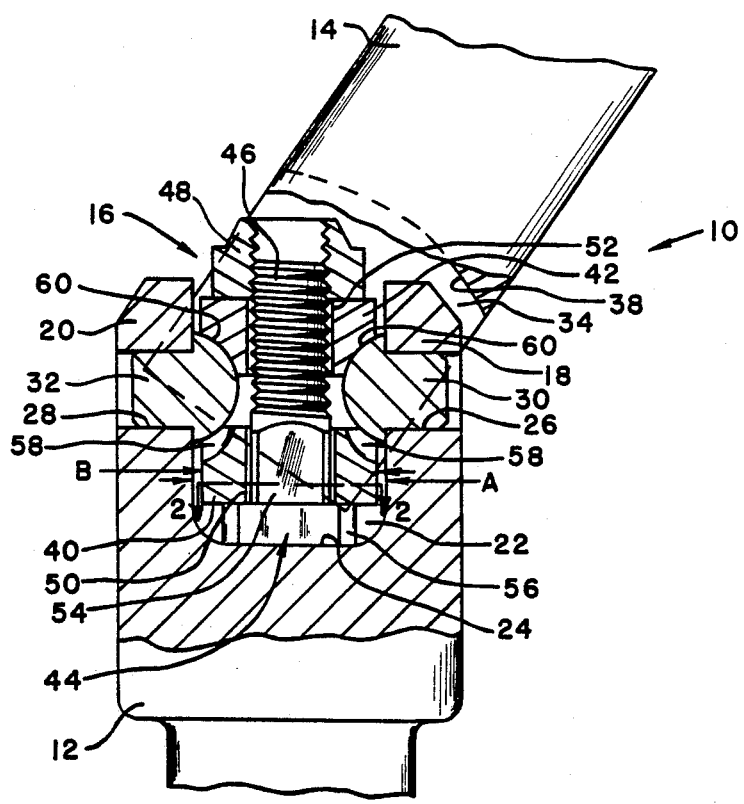
FIG. 1 is a side view of the universal joint partially assembled.

The universal joint 10 includes a first member 12, a second member 14 and a coupling assembly 16 carried therebetween to permit angular orientation between the members while preventing rotation between the first member 12 and the second member 14 relative to their axes.

The first member 12 includes a pair of arms 18, 20 forming a cavity 22 therebetween with a bottom wall 24. Each arm 18, 20 is provided with an aperture 26, 28 for receiving ball studs 30, 32. Similarly, although not shown completely, the second member 14 includes arms forming a cavity 34 with a bottom wall 38 and carrying a pair of ball studs.

The coupling assembly 16 includes a pair of washer-like seats 40 and 42 and a nut and bolt assembly 44 with a bolt 46 threaded to a nut 48. The washer-like seats 40 and 42 are provided with openings 50 and 52, respectively, to receive a shank 54 of bolt 46 extending from a head 56 to the threads of the bolt. The washer-like seats 40 and 42 are also provided with four (only two of which are shown) recesses 58 and 60, respectively matching the profile of the spherical portion of the ball studs 30 and 32.

Figure 2:
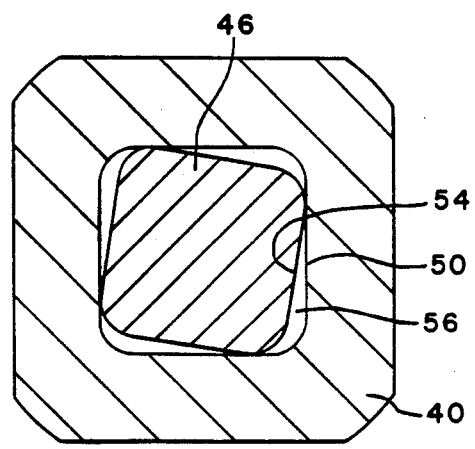
FIG. 2 is a cross sectional view taken along line 2—2 of FIG. 1

In FIG. 2 it is seen that the opening 50 is rectangular and the shank 54 adjacent the head 56 is also rectangular so that only a limited amount of rotation is permitted between the bolt 46 and the washer-like seat 40. The rectangular shapes for the shank 54 and the opening 50 could be matching to prevent any rotation between the washer-like seat 40 and the bolt 46.

In the partially assembled view of FIG. 1, the bolt head 56 is engaged with the bottom wall 24 of the first member 12 and the washer-like seat 40 is adjoining the head 56. Although the washer-like seat 40 is not fully engaged with the ball studs 30 and 32, it does form an interference therewith and also with the arms 18, 20 so that rotation of the bolt 46 and washer-like seat 40 relative to the ball studs and the arms 18, 20 is prevented. Consequently, rotation of the nut 48 will apply a torque to the bolt 46 and this torque will be opposed by the ball studs 30 and 32 via the washer-like seat 40. As a result, the nut 48 is easily threaded to the bolt 46 to move the latter upwardly, viewing FIG. 1, to fully engage the washer-like seat 40, via recesses 58, with the ball studs 30 and 32.

The transverse dimension A of the cavity 22 is substantially equal to but slightly greater than the transverse dimension B of the washer-like seat 40. Moreover, when the washer-like seat 40 is fully engaged with the ball studs 30 and 32 the clearance between the head 56 and the bottom wall 24 is less than the vertical dimension of the recesses 58, thereby providing a close fit for the coupling assembly 16 in the cavity 22. In addition, if either member 12 or 14 is enlarged at the coupling assembly 16, access to the cavity 22 is limited so that a holding tool or the like will not be engageable with the head 56. However, with the washer-like element opposing the shank 54 and the ball studs or arms 18, 20, a holding tool or the like is not necessary for the head 56.

In order to assemble the universal joint, the bolt 46 is disposed in the opening 50 and the washer-like seat 40 rotated into the cavity to engage the head 56 with the botttom wall 24. The member 14 is disposed perpendicular to the member 12 with their corresponding arms equally spaced from each other. The washer-like seat 42 is disposed over the bolt 46 in engagement with the ball studs, as shown in FIG. 1 and the nut is threaded to the bolt to the desired torque setting to fully engage both washer-like seats with the ball studs. For this assembly only one wrench or ratchet is needed to tighten the nut 48 so that the bolt 46 is independent of any wrench or holding tool.

We claim:

1. A universal joint comprising a first member and a second member rotatable together about their individual axes which are angularly disposed with respect to each other, each of the members carrying a pair of ball studs, a pair of washer-like seats engageable with the ball studs and a nut and bolt assembly cooperating with the pair of washer-like seats to retain the latter in engagement with the ball studs, characterized in that said nut and bolt assembly cooperates with one of said pair of washer-like seats to define a nonrotatable interface and said one washer-like seat is disposed in opposition to said first member to prevent rotation of said one washer-like seat when the nut and bolt assembly are being assembled to engage the pair of washer-like seats with the ball studs, said one washer-like seat cooperating with at least one of said ball studs during assembly to permit said pair of washer-like seats to fully engage said ball studs in the absence of a holding tool preventing rotation of said nut and bolt assembly, said first member defines a cavity receiving said nut and bolt assembly, and said bolt includes a head engageable with a bottom wall of said cavity when said one washer-like seat is engaging said head and in opposition with said one ball stud.

2. The universal joint of claim 1 in which said head is engageable with said bottom wall when said one washer-like seat is in opposition with said one ball stud and before said nut and bolt assembly is completely assembled, but after said nut and bolt assembly are coupled together.

* * * * *